(12) United States Patent
Kiss

(10) Patent No.: US 10,617,998 B2
(45) Date of Patent: Apr. 14, 2020

(54) METHODS TO EXTRACT CARBON DIOXIDE FROM THE ATMOSPHERE USING A SOLAR PV MODULE AS PART OF A COMBINED CYCLE ENERGY CONVERTER

(71) Applicant: Zoltan J. Kiss, Budapest (HU)

(72) Inventor: Zoltan J. Kiss, Budapest (HU)

( * ) Notice: Subject to any disclaimer, the term of this patent is extended or adjusted under 35 U.S.C. 154(b) by 0 days.

(21) Appl. No.: 15/948,484

(22) Filed: Apr. 9, 2018

(65) Prior Publication Data

US 2019/0308137 A1 Oct. 10, 2019

(51) Int. Cl.
| | |
|---|---|
| *B01D 53/62* | (2006.01) |
| *B01D 53/78* | (2006.01) |
| *H02S 40/44* | (2014.01) |
| *C01D 7/07* | (2006.01) |

(52) U.S. Cl.
CPC ............ *B01D 53/78* (2013.01); *B01D 53/62* (2013.01); *C01D 7/07* (2013.01); *H02S 40/44* (2014.12); *B01D 2251/306* (2013.01); *B01D 2251/506* (2013.01); *B01D 2251/604* (2013.01); *B01D 2257/504* (2013.01); *B01D 2258/06* (2013.01)

(58) Field of Classification Search
None
See application file for complete search history.

(56) References Cited

U.S. PATENT DOCUMENTS

| | | |
|---|---|---|
| 7,914,758 B2 | 3/2011 | Murray et al. |
| 9,000,289 B2 | 4/2015 | Vandermeulen et al. |
| 9,086,223 B2 | 7/2015 | Vandermeulen et al. |
| 9,243,810 B2 | 1/2016 | Vandermeulen et al. |
| 9,273,877 B2 | 3/2016 | Vandermeulen et al. |
| 9,377,207 B2 | 6/2016 | Vandermeulen et al. |
| 9,429,332 B2 | 8/2016 | Vandermeulen et al. |

FOREIGN PATENT DOCUMENTS

| | | |
|---|---|---|
| WO | 2007146050 | 12/2007 |
| WO | 2009065577 | 5/2009 |
| WO | 2009103963 | 8/2009 |
| WO | 2015035521 | 3/2015 |

*Primary Examiner* — Daniel Berns
(74) *Attorney, Agent, or Firm* — Gearhart Law LLC

(57) ABSTRACT

Systems and methods are provided for reclaiming $CO_2$ from air. The method includes absorbing solar radiation using a special photovoltaic panel, the H-SPV, which is so designed that the heat absorbed by the H-SPV is conducted to the back of the H-SPV to the substrate, and there it is cooled by the airstream behind it. A second supporting panel is included to provide enclosure for the heated air that rises between the two panels by the chimney effect, the heated air between the at least two plates will rise by the chimney effect, sucking in more air to be heated, wherein the air includes $CO_2$, chemically removing the $CO_2$ from the heated air, using a coolant liquid, wherein the coolant liquid in a heat exchanger, when in contact with the $CO_2$ in the heated air, forms a bicarbonate, and releasing air that has had the $CO_2$ chemically removed.

5 Claims, 3 Drawing Sheets

US 10,617,998 B2

METHODS TO EXTRACT CARBON DIOXIDE FROM THE ATMOSPHERE USING A SOLAR PV MODULE AS PART OF A COMBINED CYCLE ENERGY CONVERTER

CLAIM OF PRIORITY

This application is a United States non-provisional application and claims no priority to any previous United States patent or patent application.

FIELD OF THE EMBODIMENTS

This invention relates Carbon Dioxide reclamation devices and, in particular, to a system and method of reclaiming Carbon Dioxide from the atmosphere using uniquely designed solar PV modules.

BACKGROUND OF THE EMBODIMENTS

Greenhouse gases, in particular Carbon Dioxide ($CO_2$), have contributed to the warming of the Earth due to the greenhouse effect. The burning of fossil fuels, the farming of cattle, and other reasons have resulted in human civilization increasing the amount of $CO_2$ being emitted into the Earth's atmosphere.

Presently, there are approximately 400 ppm $CO_2$ in the atmosphere. The half-life of $CO_2$ is more than 100 years. If humanity wishes to reverse the effects of climate change, not only does the burning more fossil fuels have to cease (or at least diminish), but the amount of greenhouse gases already in the atmosphere must be extracted.

Therefore, an easy and efficient method of removing greenhouse gases from the atmosphere is needed.

Examples of related art are described below:

U.S. Pat. No. 7,914,758 generally describes a $CO_2$ control device and method for capturing $CO_2$ from fluid flow, including: a flow-through apparatus and an $CO_2$ absorbing filter treated with an alkaline material which is housed within the flow-through apparatus. The flow-through apparatus receives fluid flow and the $CO_2$ from the fluid flow is absorbed by the $CO_2$ absorbing filter. The absorbed $CO_2$ is converted into $CaCO_3$ which is combined with volcanic ash to form a useful cement material.

U.S. Pat. No. 9,000,289 generally describes methods and systems for air conditioning, capturing combustion contaminants, desalination, and other processes using liquid desiccants.

U.S. Pat. No. 9,086,223 generally describes methods and systems for air conditioning, capturing combustion contaminants, desalination, and other processes using liquid desiccants.

U.S. Pat. No. 9,243,810 generally describes a desiccant air conditioning system that treats an air stream entering a building space. The system includes a conditioner having multiple structures arranged in a substantially vertical orientation, each having at least one surface across which a liquid desiccant can flow. The air stream flows through or between the structures such that the liquid desiccant dehumidifies the air stream in a warm weather operation mode and humidifies the air stream in a cold weather operation mode. Each structure further includes a desiccant collector at a lower end of the at least one surface for collecting liquid desiccant that has flowed across the at least one surface of the structure. A regenerator receives liquid desiccant from the desiccant collectors in the conditioner and causes the liquid desiccant to desorb water in the warm weather operation mode and to absorb water in the cold weather operation mode.

U.S. Pat. No. 9,273,877 generally describes a desiccant air conditioning system for coolant an air stream entering a building space includes a conditioner and a regenerator. The conditioner includes structures arranged in a substantially vertical orientation that are spaced apart from each other with an air stream gap between each pair of adjacent structures. Each structure has a surface facing an air stream gap across which a liquid desiccant can flow. The air stream flows through the air stream gaps between the structures such that the liquid desiccant dehumidifies the air stream. Each structure further includes a separate desiccant collector at a lower end of the surface for collecting liquid desiccant that has flowed across the surface of the structure. The desiccant collectors are spaced apart from each other to permit airflow therebetween. A photovoltaic-thermal module heats a heat transfer fluid used to heat the liquid desiccant in the regenerator.

U.S. Pat. No. 9,377,207 generally describes methods and systems for air conditioning, capturing combustion contaminants, desalination, and other processes using liquid desiccants.

U.S. Pat. No. 9,429,332 generally describes a desiccant air conditioning system for treating an air stream entering a building space includes a conditioner, an air treatment unit, and a regenerator. The air treatment unit acts as an evaporative chiller in a warm weather operation mode to cool heat transfer fluid used in the conditioner. The evaporative chiller receives at least a portion of a dehumidified air stream exiting the conditioner and heat transfer fluid from the conditioner, and causes the portion of the dehumidified air stream to absorb water from a water source and thereby cool the heat transfer fluid. The regenerator receives liquid desiccant from the conditioner and absorbs water from the liquid desiccant.

International Patent Publication No. WO2007146050A2 generally describes a bio-renewable thermal energy heating and coolant system which is capable of rejection, reclamation and cogeneration. The refrigeration system of the present invention utilizes one or more evaporators and one or more condensers to transform thermal energy in the form of waste heat in one environment for use in another environment. The hot and cold sides of the refrigeration process may be split for multiple applications for increased utilization of the system energy. The environmental variables are balanced so as to optimize the properties of the refrigerant and the capabilities of the system compressor.

International Patent Publication No. WO2008009049 generally describes a method and apparatus in which, at an absorber station, $CO_2$ is absorbed from a gas stream into a suitable solvent whereby to convert the solvent into a $CO_2$-enriched medium, which is conveyed to a desorber station, typically nearer to a solar energy field than to the absorber station. Working fluid, heated in the solar energy field by insolation, is employed to effect desorption of $CO_2$ from the $CO_2$-enriched medium, whereby to produce separate $CO_2$ and regenerated solvent streams. The regenerated solvent stream is recycled to the absorber station. The $CO_2$-enriched medium and/or the regenerated solvent stream may be selectively accumulated so as to respectively optimize the timing and rate of absorption and desorption of $CO_2$ and/or to provide a storage of solar energy.

International Patent Publication No. WO2009065577 generally describes a grid-connected power plant, having the following systems which are adjusted in their capacitance to each other: a) a wind power plant, water power plant, solar-thermal system and/or photovoltaic system for the production of electrical energy for operating the systems b) through f); b) a $CO_2$ absorption system for the absorption of atmospheric $CO_2$; c) a $CO_2$ desorption system for the desorption of the $CO_2$ gained in b); d) an electrochemical or solar-thermal $H_2$ synthesis system for the operating system e); e) a synthesis system selected from the group catalytic methanol synthesis, catalytic DME synthesis, catalytic methane synthesis; f) a storage system selected from the group methanol storage system, DME storage system, methane storage system. The invention also relates to the use of such a power plant and methods for the operation of such a power plant.

International Patent Publication No. WO2009103963A1 generally describes an integrated ventilation and heating system for a room, building or the like comprises a ventilation stack having an interior space, a first opening which in use provides fluid communication between the interior space and the room, building or the like to be ventilated, and a second opening which in use provides fluid communication between the interior space and ambient atmosphere, the interior space in use providing a mixing space for air entering the stack from the room and air entering the stack from the ambient atmosphere. A heating control device controls the operation of a heating apparatus that provides heat to the room, building or the like. A system controller controls both the operation of the heating control device and the size of at least the second opening according to a pre-determined room condition.

International Patent Publication No. WO2015035521 generally describes a membrane-less electrochemical reactor for use in processes for the electro-reduction of $CO_2$. The reactor has an anode and a 3D cathode, separated by an electronically insulating layer, preferably a porous hydrophilic material or a hydrophobic material.

None of the art described above addresses all of the issues that the present invention does.

SUMMARY OF THE EMBODIMENTS

According to an aspect of the present invention, a method for reclaiming Carbon Dioxide from air is provided. The method includes absorbing solar radiation using a photovoltaic panel, wherein the solar photovoltaic panel is a uniquely designed H-SPV panel that includes a suitable substrate back layer of the H-SPV panel of high thermal conductivity. This back layer, stores the heat that was absorbed by the semiconducting layer of the H-SPV panel, is the substrate of the H-SPV panel. According to an embodiment, this substrate is cooled by the air rising behind the panel, thereby cooling also the absorbing photovoltaic layer. The combined cycle energy converter includes a second back supporting panel forming an enclosed airspace, producing heated air, causing the heated air to rise, sucking in more air to be heated, wherein the air includes Carbon Dioxide, chemically removing the Carbon Dioxide from the heated air, using a coolant liquid, wherein the coolant liquid in a heat exchanger, when in contact with the Carbon Dioxide in the heated air, forms a bicarbonate, and releasing air that has had the Carbon Dioxide chemically removed.

The solar radiation heats the plate of the H-SPV panel, producing heated air, causing the heated air to rise, sucking in more air to be heated, wherein the air includes Carbon Dioxide. The system further includes a heat exchanger, wherein the heat exchanger includes a coolant liquid configured to chemically removing the Carbon Dioxide from the heated air such that, when the coolant liquid is in contact with the Carbon Dioxide in the heated air, the coolant liquid reacts with the Carbon Dioxide, forming a bicarbonate, and an air exhaust opening configured to enable air that has had the Carbon Dioxide chemically removed to be released.

It is an object of the present invention to provide the method for reclaiming Carbon Dioxide from air, wherein the coolant includes Potassium Hydroxide.

It is an object of the present invention to provide the method for reclaiming Carbon Dioxide from air, wherein the bicarbonate includes Potassium Bicarbonate.

It is an object of the present invention to provide the method for reclaiming Carbon Dioxide from air, wherein the method further includes converting some of the solar radiation into electricity.

It is an object of the present invention to provide the method for reclaiming Carbon Dioxide from air, wherein the method further includes converting some heat produced by the solar radiation to electricity.

It is an object of the present invention to provide the method for reclaiming Carbon Dioxide from air, wherein the method further includes exchanging some heat of the heated air with the coolant liquid.

It is an object of the present invention to provide the method for reclaiming Carbon Dioxide from air, wherein the method further includes removing the bicarbonate from the heat exchanger.

It is an object of the present invention to provide the system for reclaiming Carbon Dioxide from air, wherein the coolant includes Potassium Hydroxide.

It is an object of the present invention to provide the system for reclaiming Carbon Dioxide from air, wherein the bicarbonate includes Potassium Bicarbonate.

It is an object of the present invention to provide the system for reclaiming Carbon Dioxide from air, wherein the energy converter includes a thermal energy converter configured to convert some heat produced by the solar radiation to electricity.

It is an object of the present invention to provide the system for reclaiming Carbon Dioxide from air, wherein the coolant liquid is configured such that the heated air exchanges some heat with the coolant liquid.

It is an object of the present invention to provide the system for reclaiming Carbon Dioxide from air, wherein the at least two plates include a heat absorbing film.

It is an object of the present invention to provide the system for reclaiming Carbon Dioxide from air, wherein the film includes graphite.

According to another aspect of the present invention, a method to extract the Carbon Dioxide from the air is provided. In this method, the air is brought in direct contact with the liquid that contains the KOH solution. According to another aspect, instead of a liquid, a special filter is used impregnated with a reactive material to react with the $CO_2$ in the atmosphere. The filter may provide a large area to intercept the airflow with the $CO_2$ in it. The filter may be changed periodically.

According to yet another aspect of the present invention, the coolant liquid that acts as a heat exchanger laminally flows by the whole back plate of the H-SPV module to cool the H-SPV module and, in the process, may react with the $CO_2$ to extract the $CO_2$. This aspect may be used if the H-SPV module is part of a roof top.

DESCRIPTION OF THE PREFERRED EMBODIMENTS

Figure 1:
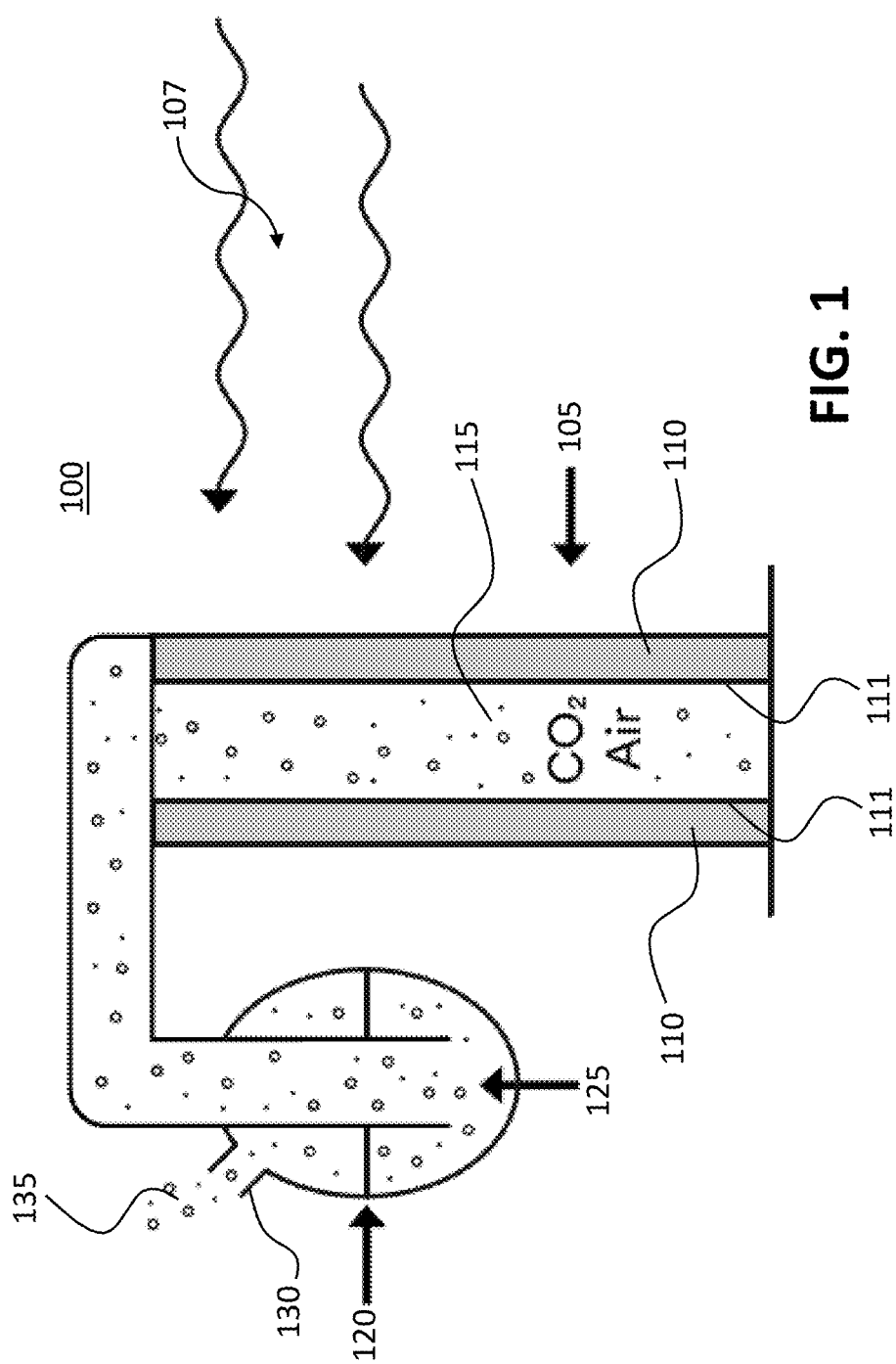
FIG. 1 shows a system for reclaiming $CO_2$ from the atmosphere, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, a system 100 for reclaiming $CO_2$ from the atmosphere is illustratively depicted, in accordance with an embodiment of the present invention.

Greenhouse uses do not isolate themselves to one isolated section of the atmosphere. Therefore, in order to extract unwanted greenhouse gases from the atmosphere, a meaningful part of the atmosphere has to be circulated. This may be achieved with the use of solar energy technology.

According to an embodiment, the system 100 includes an SPV/thermal electricity converter 105 configured to convert solar radiation 107 and heat to electricity. It is noted, however, that strictly SPV modules may also be used in conjunction with the present system 100, while maintaining the spirit of the present invention. According to an embodiment, the system 100 shown in FIG. 1 represents a 1 m$^2$ module. However, other sized modules may also be used in conjunction with the present invention.

According to an embodiment, the SPV converter 105 includes two or more thermally conductive plates 110 (which only includes heat absorbing film 111 on the H-SPV plate, which is the plate towards the Sun's radiation), forming a heat isolator, wherein $CO_2$-containing air 115 can be heated by the heat absorbed by the plates 110, resulting in the rise of the air 115 due to the chimney effect. According to an embodiment, the film 111 includes graphite. However, it is noted that other heat absorbing materials may also be used for the film 111.

According to an embodiment, the plates 110 include a front, heat-absorbing plate, and a back supporting member plate configured to create the chimney effect.

According to an embodiment, the geometry and thermal properties of the films 111 that determine the chimney effect between the two plates 110 are configured in such a way that every minute approximately 1 m$^3$ air 115 will be heated and go up between the plates 110. However, it is noted that other air 115 flow rates may also be achieved using the system 100 of the present invention.

According to an embodiment, the semiconductor material of the SPV converter 105 absorbs the sun's radiation throughout the whole electromagnetic spectrum and converts approximately 20% of the solar radiation 107 to electricity, and 80% of the absorbed energy will heat the SPV material. However, it is noted that, with improvements and alterations to SPV and thermal heat converters, these percentages may change. This heat will in turn heat up the air between the plates. The warmer lighter air 115 will begin to rise with the chimney-effect, sucking in more air 115 below.

According to an embodiment, the system 100 further includes a heat exchanger 120 configured to receive the air 115 warms between the plates 110. According to an embodiment, once in the heat exchanger 120, the heat of the air 115 is exchanged with a coolant liquid 125. According to an embodiment, the coolant liquid 125 includes KOH in water. However, it is noted that other coolant liquids 125 may also be used in conjunction with the present system 100 while maintaining the spirit of the present invention. According to an embodiment, the $CO_2$ in the air 115 reacts with the coolant liquid 125, forming a bicarbonate, which can be precipitated at the heat load out of the coolant liquid 125. According to an embodiment when the coolant liquid 125 includes KOH, the chemical reaction is: $CO_2$+ KOH=>$KHCO_3$, wherein $KHCO_3$ is a bicarbonate and can be used as an industrial material. The chemical reaction, which is an exothermic chemical reaction, further increases the temperature of the coolant liquid 125. According to an embodiment, some of the thermal energy absorbed by the system 100 is converted to electricity. By collecting the thermal energy, the system 100 has a combined cycle SPV/thermal converter 105, which may reach over 50% efficiency.

According to an embodiment, the heat exchanger 120 further includes an air exhaust opening 130 for removal of the air 135 that has had some or all of the $CO_2$ removed in the heat exchanger 120.

According to an embodiment, the air is brought in direct contact with the liquid that contains the KOH solution. According to another embodiment, instead of a liquid, a special filter is used impregnated with a reactive material to react with the $CO_2$ in the atmosphere. The filter may provide a large area to intercept the airflow with the $CO_2$ in it. The filter may be changed periodically.

According to an embodiment, the coolant liquid that acts as a heat exchanger laminally flows by the whole back plate of the H-SPV module to cool the H-SPV module and, in the process, may react with the $CO_2$ to extract the $CO_2$. This embodiment may be used if the H-SPV module is part of a roof top.

Figure 2:
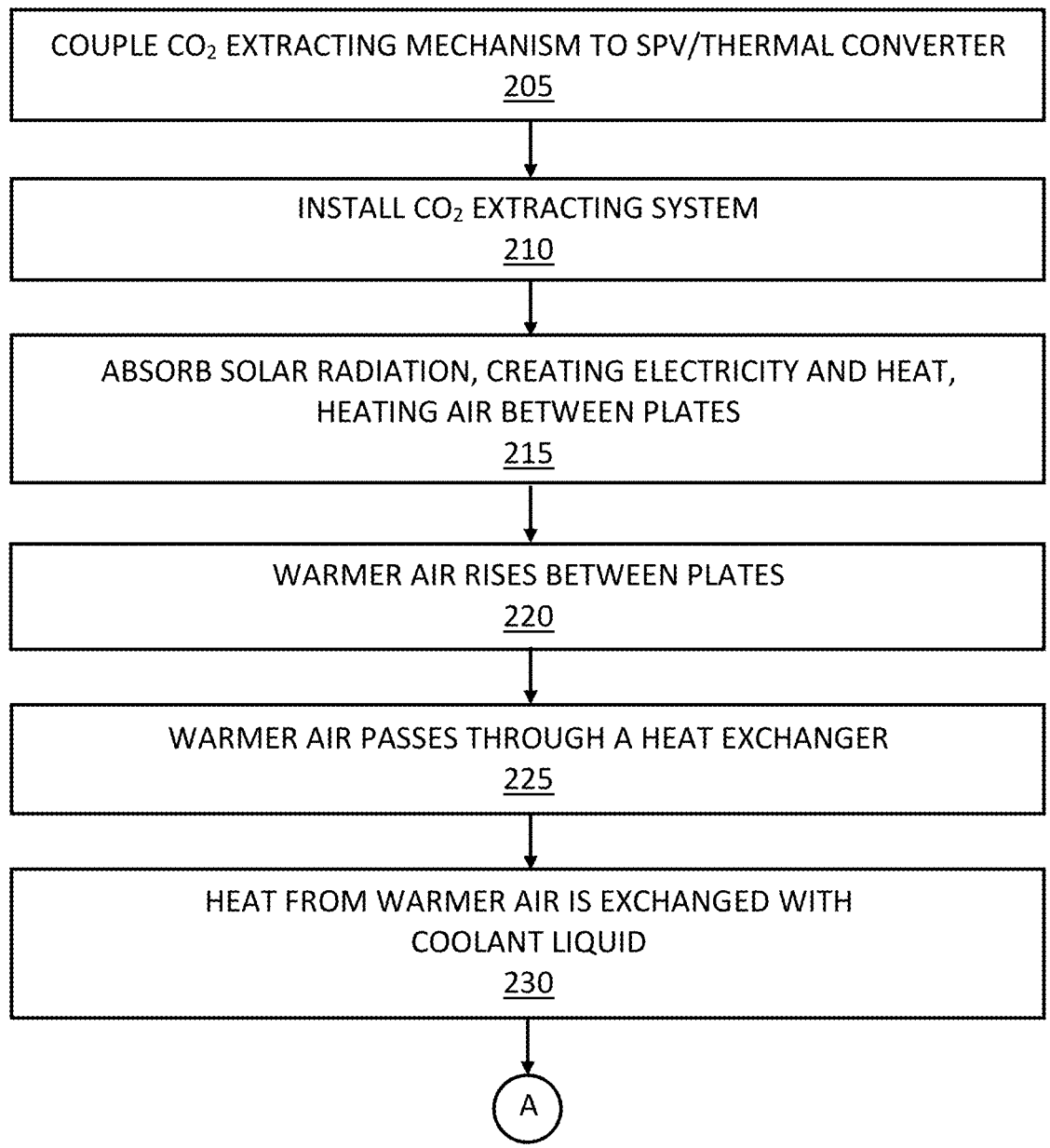
FIGS. 2-3 show a method for reclaiming $CO_2$ from the atmosphere, according to an embodiment of the present invention.
Figure 3:
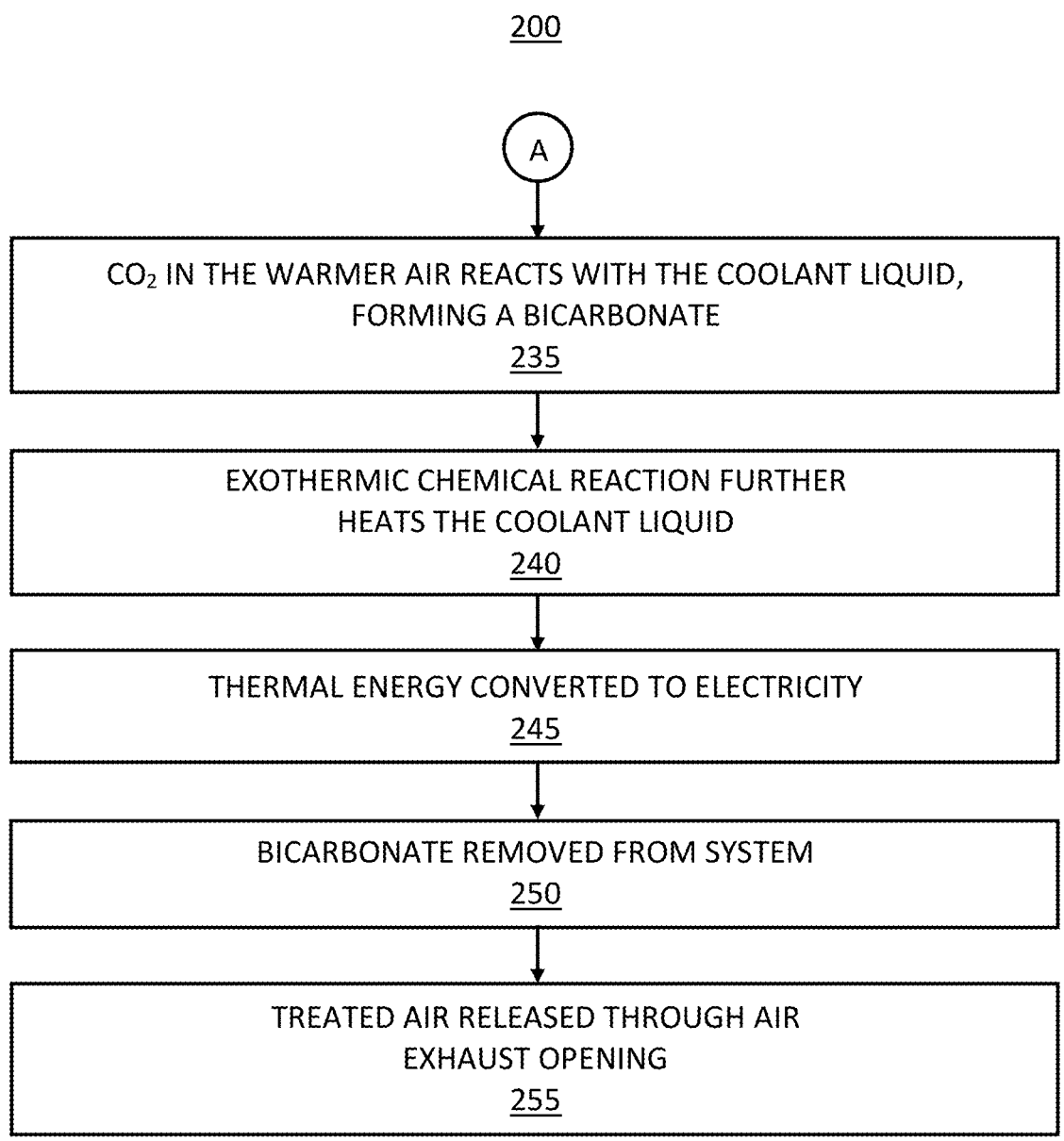

Referring now to FIGS. 2-3, a method 200 for reclaiming $CO_2$ from the atmosphere is illustratively depicted, in accordance with an embodiment of the present invention.

At step 205, a $CO_2$ extracting apparatus is coupled to a SPV/thermal converter 105 capable of converting solar radiation 107 and thermal energy to electricity, creating a $CO_2$ extracting system 100. This system 100, at step 210, is installed. According to an embodiment, this system 100 includes two or more SPV panel plates 110 to form a heat isolator.

At step 215, the heat absorbing film 111 of the SPV plates 110 absorbs solar radiation 107, converting some of the solar radiation 107 to electricity and further heating the SPV panel 105. This causes the temperature of the air 115 (which includes $CO_2$) inside the heat isolator (between the plates 110) of the system 110 to rise, relevant to air outside the system, creating warmer air 115 inside the heat isolator between the plates 110.

At step 220, the warmer air 115 rises between the plates 110, due to the chimney-effect, sucking in more outside air into the heat isolator. According to an embodiment, the rising air 115 results in an approximate 1 m$^3$ of air 115 to flow between the plates 110 per minute.

At step 225, the warmer air 115 passes through a heat exchanger 120 where, at step 230, the heat of the air 115 is exchanged with a coolant liquid 125. According to an embodiment, the coolant liquid 125 includes KOH. It is noted, however, that other coolant liquids 125 may also be used, while maintaining the spirit of the present invention.

At step 235, the $CO_2$ in the air 115 reacts with the coolant liquid 125, forming a bicarbonate, which can be precipitated at the heat load out of the coolant liquid 125. According to an embodiment, when the coolant liquid 125 includes KOH, the chemical reaction is $CO_2+KOH \Rightarrow KHCO_3$, wherein $KHCO_3$ is a bicarbonate and can be used as an industrial material.

At step 240, the chemical reaction, which is an exothermic chemical reaction, further increases the temperature of the coolant liquid 125.

At step 245, some of the thermal energy absorbed by the system 100 is converted to electricity using the SPV/thermal converter 105.

At step 250, the bicarbonate containing the $CO_2$ is removed from the system 100 and collected.

At step 255, the treated air 135 is released through an air exhaust opening 130.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for reclaiming Carbon Dioxide from air, comprising:
    absorbing solar radiation using a plurality of solar photovoltaic panels, wherein each of the solar photovoltaic panels includes a support plate located behind and separated by a distance from at least one heating plate configured to heat air,
        wherein the at least one heating plate including a heat-absorbing film that is positioned towards a solar radiation source,
        wherein the distance forms a heat insulating enclosure, and
        wherein the configuration of each of the solar photovoltaic panels provides a chimney effect;
    heating the air between the plurality of photovoltaic panels to produce heated air and cause approximately 1 m³ of the heated air to rise and flow through the heat insulating enclosure every minute,
        wherein due to the chimney effect, more of the air to be heated is sucked into the heat insulating enclosure, and
        wherein the air includes Carbon Dioxide;
    chemically removing the Carbon Dioxide from the heated air by using a coolant liquid,
        wherein the coolant liquid is potassium hydroxide in water, and
        wherein the coolant liquid, in a heat exchanger, contact the Carbon Dioxide in the heated air to form a bicarbonate; and
    releasing the air having the Carbon Dioxide chemically removed.

2. The method as recited in claim 1, further comprising converting some of the solar radiation into electricity.

3. The method as recited in claim 1, further comprising converting some heat produced by the solar radiation to electricity.

4. The method as recited in claim 1, further comprising exchanging some heat of the heated air with the coolant liquid.

5. The method as recited in claim 1, further comprising removing the bicarbonate from the heat exchanger.

\* \* \* \* \*